United States Patent
Trüggelmann et al.

[19]

[11] Patent Number: 5,936,227
[45] Date of Patent: Aug. 10, 1999

[54] PLASTICS CARD COMPRISING A MINI-SMART-CARD WHICH CAN BE SEPARATED THEREFROM

[75] Inventors: Uwe Trüggelmann; Thomas-Lothar Schulte; Rainer Blome, all of Paderborn, Germany

[73] Assignee: Orga Kartensysteme GmbH, Paderborn, Germany

[21] Appl. No.: 08/945,448

[22] PCT Filed: Feb. 21, 1997

[86] PCT No.: PCT/DE97/00316

§ 371 Date: Nov. 10, 1997

§ 102(e) Date: Nov. 10, 1997

[87] PCT Pub. No.: WO97/31334

PCT Pub. Date: Aug. 28, 1997

[30] Foreign Application Priority Data

Feb. 23, 1996 [DE] Germany .......................... 196 06 789

[51] Int. Cl.6 ..................................................... G06K 19/06
[52] U.S. Cl. ............................................. 235/492; 235/487
[58] Field of Search ................................... 235/487, 488, 235/492

[56] References Cited

FOREIGN PATENT DOCUMENTS 0 638 873 7/1994 European Pat. Off. .
40 07 221 9/1991 Germany .
40 40 296 1/1992 Germany .

OTHER PUBLICATIONS

International Search Report for PCT/DE97/00316 dated Jul. 18, 1997.

Primary Examiner—F. L. Evans
Attorney, Agent, or Firm—Cohen, Pontani, Lieberman & Pavane

[57] ABSTRACT

A plastic card includes a minichip card separably held in a carrier card. First and second separate and discrete breaking regions connect the minichip card to the carrier card along an outer contour of the minichip card. A gap separates a remainder of the outer contour of the minichip card from the carrier card. A breaking line on the carrier card, which has a higher flexibility than the rest of the carrier card, is interrupted by the gap and is closer to the first breaking region than to the second breaking region. When the carrier card is bent along the breaking line, the first breaking region separates, thereby leaving the minichip card attached to the carrier card by the second breaking region only. To fully separate the minichip card from the carrier, the minichip card is pivoted relative to the carrier card along the second breaking region until the second breaking region separates.

36 Claims, 8 Drawing Sheets

PLASTICS CARD COMPRISING A MINI-SMART-CARD WHICH CAN BE SEPARATED THEREFROM

FIELD OF THE INVENTION

The invention relates to a plastic card in which a minichip card is held such that it can be broken out. Chip cards have by now become very widespread, for example as phone cards, sickness insurance cards, as identification and access authorization cards for mobile radio systems, such as the GSM European Standard, or as credit cards and/or cash cards.

BACKGROUND OF THE INVENTION

For reasons of standardization, the dimensions of the chipcards and the position of the contact areas have been laid down by International Standards (7810, 7816-2). Chipcards according to this standard are referred to as ID1 cards.

However, miniaturized reading/writing devices for chipcards, as are already frequently used in very small mobile radio telephones, require so-called minichip cards, since chipcards in the standard ID1 format are too large for these purposes. This minichip card differs from the chipcard in the ID1 format only by having smaller outer dimensions and a different contour. The already customary form of the minichip card is referred to as the ID000 format and will shortly likewise be defined in an international standard.

However, in the world of chipcards, this minichip card with its different dimensions is not to be regarded as isolated from the standard ID1 card format. There are various reasons for this:

a) The existing production installations and processes are designed for the production of chipcards in the ID1 format. Converting the existing production installations or creating new production installations for the direct production of chipcards in the ID000 format would be very complex and expensive. In addition equipment for the further handling of the chipcards after card production, in so-called card personalization installations, is also designed for the ID1 format. For this and other reasons, minichip cards are produced such that chipcards are initially produced in the ID1 format and the minichip cards are subsequently broken out from the card body. After production the minichip card may be completely broken out, or separated, from the card body in the ID1 format by the card manufacturer, for example by punching. Alternatively the minichip card is only partially punched out from the card body in the ID1 format and the minichip card remaining connected to the card body in the ID1 format by means of connecting lugs and/or notches such that the customer (card owner) can break out (break off, bend off, tear off) the minichip card without further aids.

b) A further reason not to produce minichip cards directly is that afforded by the greater flexibility of this procedure. For example, if a card issuer, the operator of a mobile radio network, requires at short notice more minichip cards than chipcards in the ID1 format than were originally ordered, the card manufacturer can either produce minichip cards or cards with minichip cards which can be broken out from chipcards in the ID1 format without any great effort.

c) Since the minichip card is relatively small and "inconspicuous", there is quite a high risk of it being lost on the way from the card manufacturer via the card issuer and finally to the card owner to be used in a terminal. For this reason alone, a larger card body is appropriate as a carrier for the minichip card, to a certain extent as a handy outer packaging.

d) Advertising and/or information can be readily applied to the large-area carrier card in the ID1 format by means of printing technology, which would not very well be possible on the relatively small surface of the minichip card.

PRIOR ART

Standard format cards in which the minichip cards are firmly connected to the carrier card body by means of connecting lugs are known. These cards can be used like conventional chipcards in standard format. For use of the minichip card on its own, it must be manually broken out from the carrier card by severing the connecting lugs. A problem with this type of securement of the minichip card in the carrier card is that, when breaking out the minichip card, relatively strong flexural forces are exerted on the chip module and the semiconductor device located in it. The flexural forces extended on the chip could result in damage and consequently failure of the minichip card. A further disadvantage of this type of securement is that, after breaking out the minichip card, residual lugs often remain on the minichip card, with the result that they then do not have a smooth contour; it is also possible that the minichip card tears when it is broken out.

In order to avoid the disadvantages mentioned above, it is proposed in DE 41 32 720 for the card manufacturer to punch out the minichip card completely from the carrier card and fix the minichip card in the carrier card by means of an adhesive film applied at least partially both to the carrier card and to the minichip card. This type of securement has the disadvantage, however, that it is very undesirable to apply to the usually elaborately printed surfaces of the carrier card and minichip card an adhesive film which, under certain circumstances, leaves behind remains of adhesive or damages the surface of the card when it is pulled off. On the other hand, if the adhesion is insufficient or diminishes over time, reliable securement is no longer provided. In addition, a thin adhesive film may easily tear.

Another type of securement of a minichip card in a carrier card of the standard format is described in EP 0 495 216. This type of securement allows the customer to separate the minichip card from the carrier card in a simple way and without damage; at the same time and, secure fixing of the minichip card is ensured. The surface of the card is in this case not impaired by an adhesive film. In this reference, the minichip card of the format ID000 is completely cut free along four side edges, and a straight notch is provided along its fifth side edge between the minichip card and the carrier card. This notch forms a hinge lug for easy breaking out of the minichip card. The minichip card is broken out by pivoting through 180° out of the plane of the carrier card, whereby the material of the dividing line along the notch fatigues and breaks. What is disadvantageous about this type of fixing of the minichip card in a carrier card is, however, that the minichip card may protrude out of the plane of the carrier card after punching free. This has the consequence that such cards may become hooked one in the other when they are arranged in a card stack, making it more difficult or even impossible for the cards to be individually separated by a relative displacement of the cards with respect to one another. Such individual separation of cards from a card stack is unavoidable, however, in the so-called card personalization.

SUMMARY OF THE INVENTION

Against this background, the object of the invention is to design a plastic card with a minichip card fixed in it such that it can be broken out, in such a way that on the one hand reliable fixing of the minichip card to the carrier card is ensured, on the other hand the minichip card can be broken out easily, without damage and with a smooth contour and, in addition, individual separation of these plastic cards from a card stack is possible without any problems.

In the case of the plastic card according to the invention, a first predetermined breaking region is created between the minichip card and the carrier card in the form of a notch and/or at least one connecting lug. At a distance from this first predetermined breaking region, a second predetermined breaking region is created between the minichip card and the carrier card in the form of a notch and/or at least one connecting lug. Otherwise, apart from the two predetermined breaking regions, the minichip card is completely cut free along its outer contour. Corresponding to one of the two predetermined breaking points, on the carrier card there is provided a predetermined breaking line/predetermined bending line in the form of a notch and/or in the form of a plurality of predetermined breaking points lying in a straight line and formed by cut-free portions. The predetermined breaking line/predetermined bending line in this case runs on the carrier card in such a way that it is interrupted by the cut-free portion along the outer contour of the minichip card. The minichip card is thus separated as follows from the carrier card: firstly, the carrier card is severed or bent along the predetermined breaking line/predetermined bending line, whereby at the same time the first predetermined breaking region between the minichip card and the carrier card corresponding to the predetermined breaking line/predetermined bending line is parted. With this type of severing of the first predetermined breaking region, damaging flexural forces are scarcely transferred to the minichip card. Subsequently, the minichip card is then only connected to the carrier card by means of the second predetermined breaking region. Finally, the minichip card is then detached by pivoting the minichip card out from the plane of the carrier card along the still intact second predetermined breaking region, in that the material of the dividing line breaks along the second predetermined breaking region. When this happens as well, scarcely any damaging stresses for the minichip card occur.

The minichip card can consequently be broken out from the carrier card in a simple way without any burr or fringe.

The fixing by means of two predetermined breaking regions means that the minichip card is securely held in the carrier card. Individual separation of the plastic cards according to the invention is possible without any problems, since the minichip card in this case lies exactly in the plane of the carrier card.

The invention is not restricted to plastic cards in the ID1 format and minichip cards in the ID000 format. It is not restricted to particular dimensions and contours of the carrier card and the minichip card. Rather, it represents a satisfactory solution for a separable retaining connection between a carrier card and a minichip card.

The minichip card may both be a chipcard with contacts and be a contactless chipcard, for example a transponder. In all cases, it is required that the minichip card can be broken out in such a way that the sensitive chip is not damaged.

BRIEF DESCRIPTION OF THE DRAWINGS

The invention is to be explained in more detail below with reference to the attached drawings, in which.

DETAILED DESCRIPTION OF THE PREFERRED EMBODIMENTS

Figure 1:
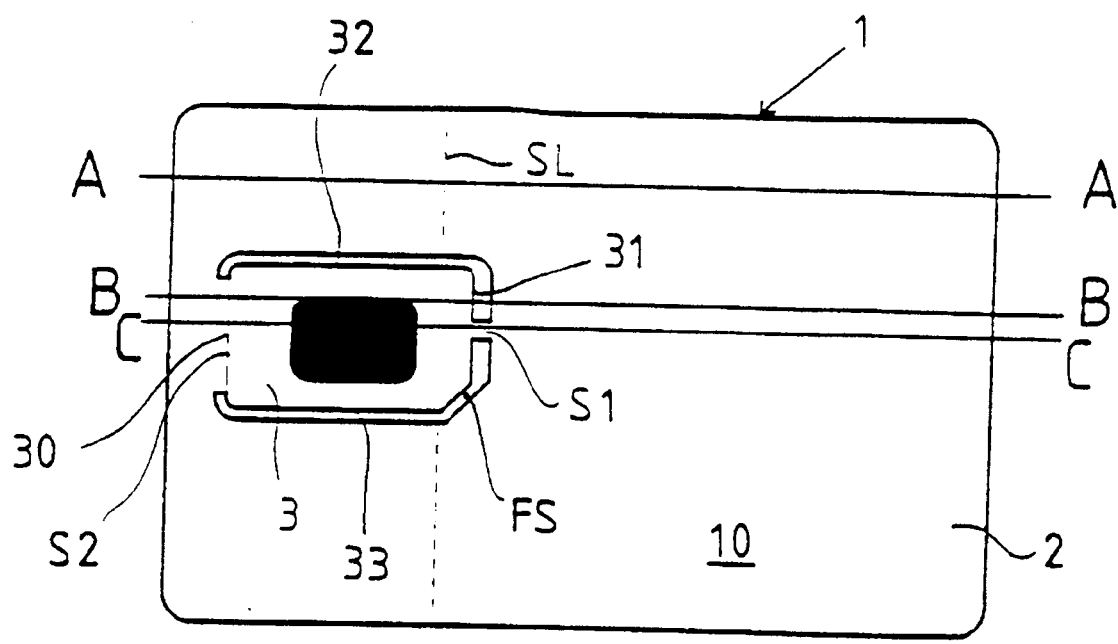
FIG. 1 shows a plan view of the front side of a card in the ID1 format with an ID000 minichip card.
Figure 17:
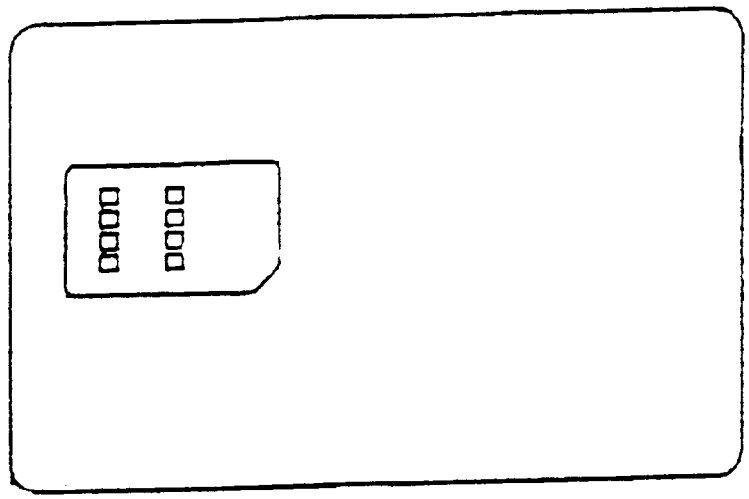
FIG. 17 shows a plan view of the front side of an ID1 card to illustrate the position of the contact areas.

Shown in FIG. 1 is a plastic card (1) in the ID1 format with a minichip card (3) in the ID000 format held in it such that it can be broken out. The surface of the chip module located in the minichip card (3) is identified by the black region. (The position of the contact areas via which the communication of the chip card with external devices takes place is represented in FIG. 17). Apart from two predetermined breaking regions (S1, S2), the essentially five-sided minichip card (3) is in this case completely cut free.

The second predetermined breaking region (S2) between the minichip card (3) and the carrier card (2) is formed in the form of a notch along that side edge (30) of the minichip card (3) which runs parallel and alongside what is defined by the standard as the left-hand edge (12) of the plastic card (1) in the ID1 format. This notch is preferably provided both in the front side and in the rear side of the plastic card (1). The notch extends over more than half the corresponding side edge (30) of the minichip card (3).

At the side edge (31), which lies parallel to the side edge (30) which is assigned to the first predetermined breaking region, there is the first predetermined breaking region (S1) between the minichip card (3) and the carrier card (2). This first predetermined breaking region (S1) is formed in the form of a narrow connecting lug, created by the cut-free portion (FS) around the minichip card (3). The connecting lug preferably has along the side edge (31) of the minichip card (3) an additional notch, both on the front side and on the rear side. The width of the connecting lug corresponds approximately to the width of the cut-free portion (FS) around the minichip card (3).

According to the invention, corresponding to the first predetermined breaking region (S1), there runs on the carrier card (2) a predetermined breaking line/predetermined bending line (SL) in the form of a notch provided on the rear side of the card (11). In this case, this predetermined breaking line/predetermined bending line (SL) runs on the carrier card (2) in such a way that it is interrupted by the cut-free portion (FS) around the minichip card (3). The predetermined breaking line/predetermined bending line (SL) is parallel to the transverse direction of the plastic card (1). The term "corresponding" means that the distance between the predetermined breaking line/predetermined bending line (SL) and the first predetermined breaking region (S1) is less than the distance between it and the second predetermined breaking region (S2), the severing or bending of the carrier card (2) along the predetermined breaking line/predetermined bending line (SL) inevitably causing the first, "corresponding" predetermined breaking region (S1) between the minichip card (3) and the carrier card (2) to part.

Figure 2:
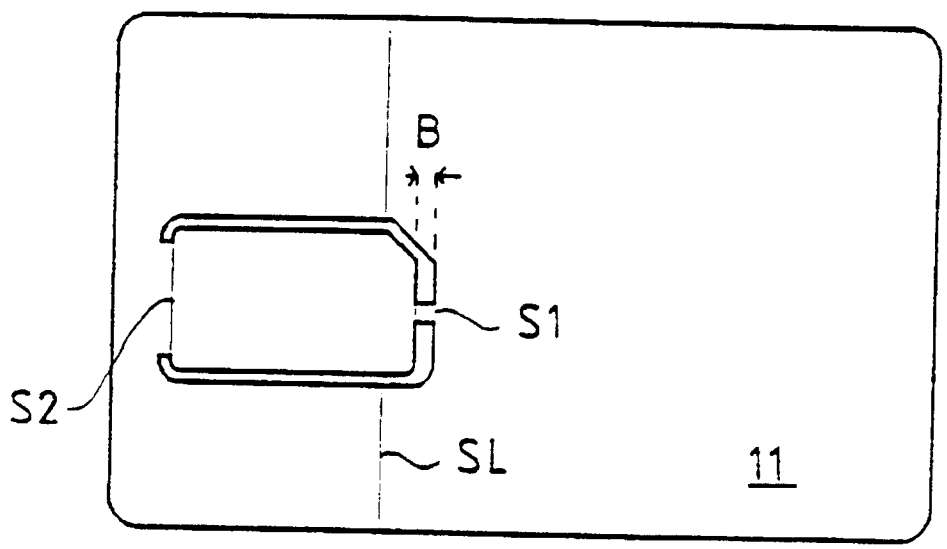
FIG. 2 shows a plan view of the rear side of the card from FIG. 1.

The path of the predetermined breaking line/predetermined bending line is represented only by dashed lines on the front side (10) of the plastic card (1) in FIG. 1, since the notch runs only on the rear side (11) of the plastic card (1)—see FIG. 2.

The plastic card may be made of a laminated material whereby, the first breaking regions (S1), second breaking region (S2), the breaking line (SL), and the cut-free area (FS) around the minichip card (3) are formed by at least one of punching and notching tools. The plastic card (1) may also be injection molded and then punched and notched or the entire plastic card including the first breaking region (S1), the second breaking region (S2), the breaking line (SL), and the cut-free area (FS) may be injection molded as one piece.

Figure 3:
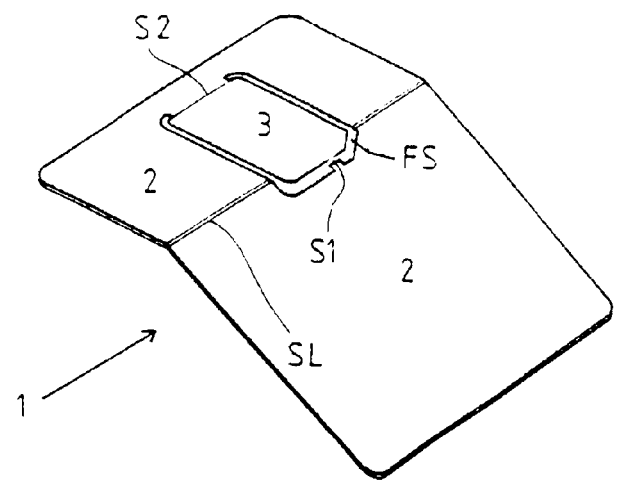
FIG. 3 shows a perspective representation of the plastic card with the carrier card bent along the predetermined breaking line/predetermined bending line and a severed first predetermined breaking region between the minichip card and the carrier card.

Shown in FIG. 3 is the plastic card (1) with the bent carrier card (2) and thereby parted connecting lug (first predetermined breaking region (S1) between the minichip card (3) and the carrier card (2). The minichip card (3) is then only held on the carrier card (2) by the material of the dividing line along the notch of the second predetermined breaking region (S2).

Figure 4:
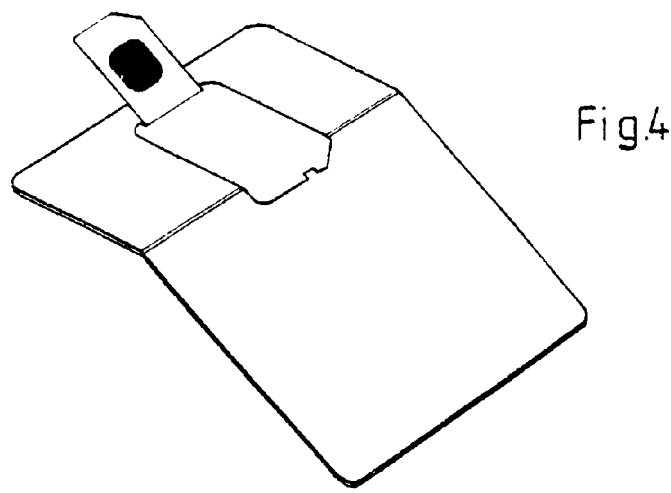
FIG. 4 shows a perspective representation of the plastic card with the minichip card pivoted out from the plane of the carrier card for the purpose of breaking it out completely.

Represented in FIG. 4 is how the minichip card (3) is pivoted out from the plane of the carrier card (2) along the notch at the second predetermined breaking region (S2), in order to separate it finally from the carrier card (2). On account of the pivoting movement, the material of the dividing line then breaks. To permit pivoting of the minichip card (3) without any problems, the width (B) (shown in FIG. 2) of the cut-free portion (FS) is greater than the thickness (D) (shown in FIG. 6) of the plastic card (1).

Figure 5:
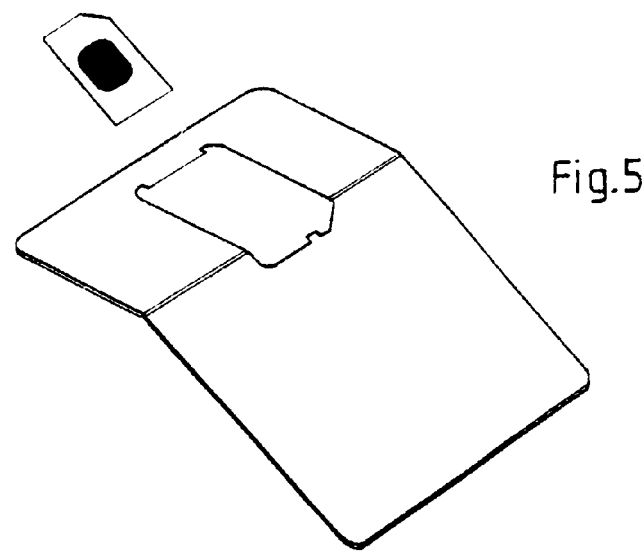
FIG. 5 shows a perspective representation of the plastic card with the bent carrier card and the completely broken out minichip card.

FIG. 5 shows the bent carrier card (2) and the minichip card (3) completely separated from it.

Figure 6:
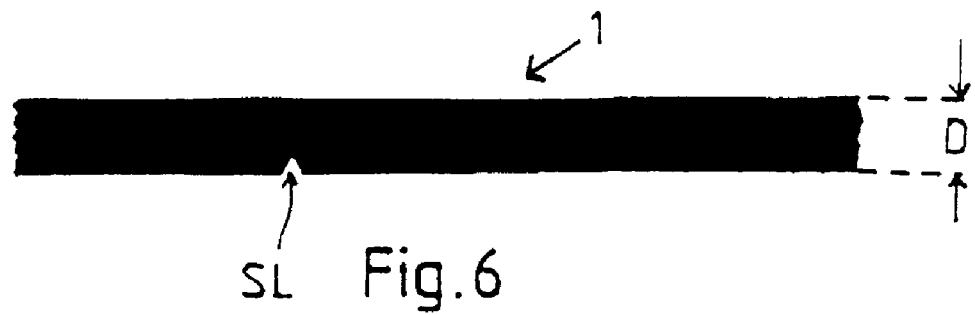
FIG. 6 shows a section through the plastic card from FIG. 1 along the line of intersection A—A.

FIG. 6 shows a section through the plastic card along the line of intersection A—A (FIG. 1). The V-shaped notch for the predetermined breaking line/predetermined bending line (SL) on the underside of the plastic card (1) can be seen.

Figure 7:
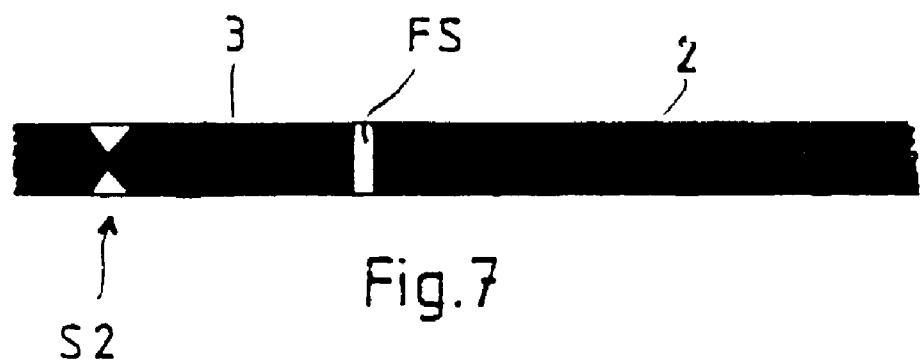
FIG. 7 shows a section through the plastic card from FIG. 1 along the line of intersection B—B.

FIG. 7 shows a section through the plastic card along the line of intersection B—B. The V-shaped notches on both sides of the plastic card (1), for the second pre-determined breaking region (S2), and the cut-free portion (FS) can be seen.

Figure 8:
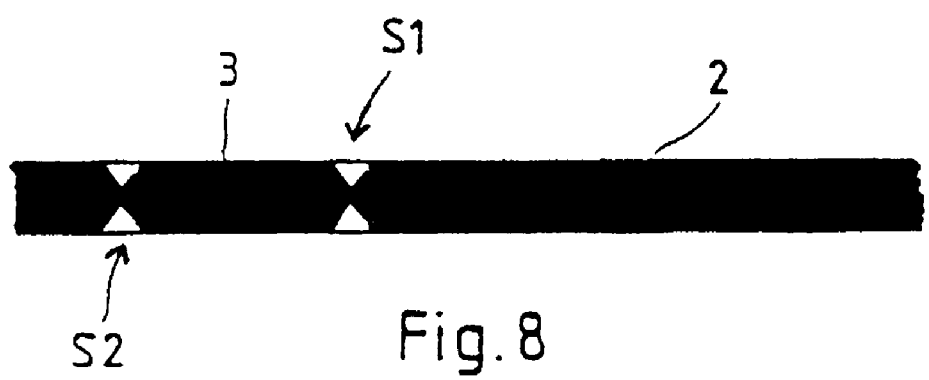
FIG. 8 shows a section through the plastic card from FIG. 1 along the line of intersection C—C.

FIG. 8 shows a section through the plastic card (1) along the line of intersection C—C. The V-shaped notches on both sides of the plastic card (1), for the two predetermined breaking regions (S1, S2), can be seen.

Figure 9:
FIG. 9 to FIG. 11 show sections through the plastic card from FIG. 1 along the line of intersection A—A, B—B, and C—C; with different notch profiles than in FIGS. 6 to 8.
Figure 10:
Figure 11:

Instead of V-shaped notches, unilaterally wedge-shaped, U-shaped or trapezoidal notches may also be provided—cf. FIGS. 9 to 11.

Furthermore, the notches in the predetermined breaking regions (S1, S2) may optionally be provided only on the front or rear side (10, 11) of the plastic card (1).

Figure 12:
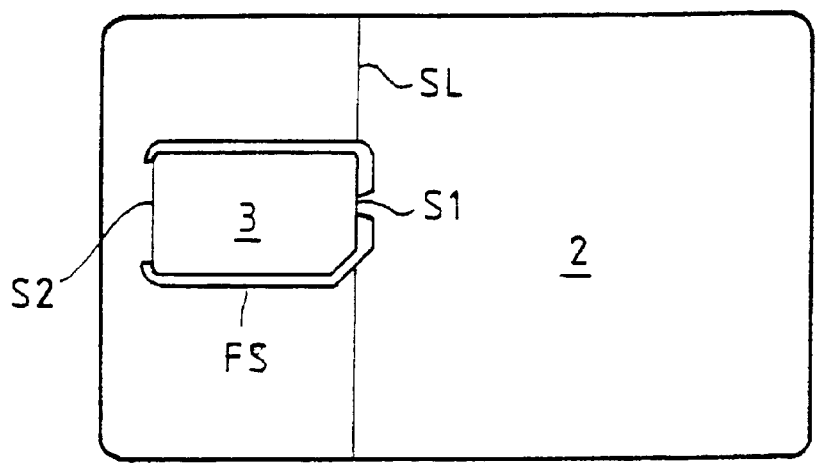
FIG. 12 shows a plan view of the underside of a plastic card as in FIG. 2, the predetermined breaking line/predetermined bending line on the carrier card running in alignment with the first predetermined breaking region.
Figure 13:
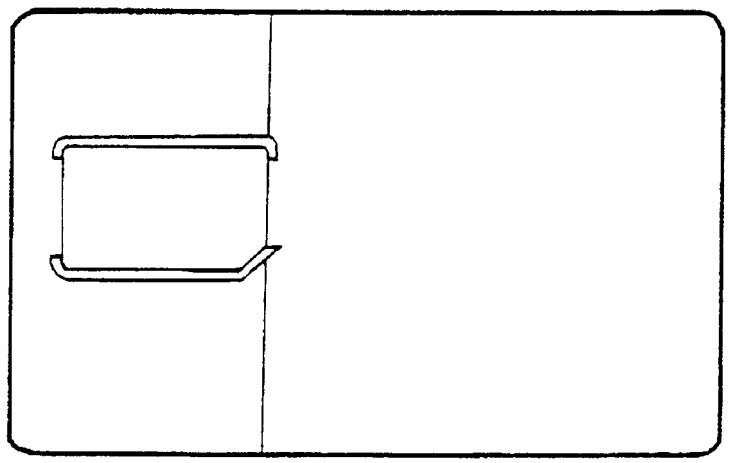
FIG. 13 shows a plan view of the underside of a plastic card as in FIG. 13, but with a lengthened first pre-determined breaking region between the minichip card and the carrier card.

Shown in FIG. 12 is a plastic card (1) in which the predetermined breaking line/predetermined bending line (SL) on the carrier card (2) runs in alignment with the side edge (30) of the first predetermined breaking region (S1). FIG. 13 shows a card as in FIG. 12, but here the connecting lug in the first predetermined breaking region (S1) is replaced by a longer notch.

Figure 14:
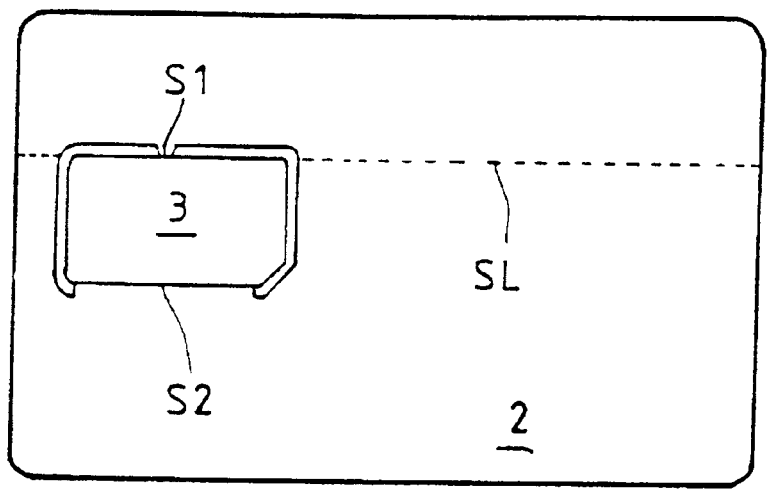
FIG. 14 shows a plan view of the front side of a plastic card, but with the predetermined breaking line/predetermined bending line running in the longitudinal direction on the carrier card.
Figure 15:
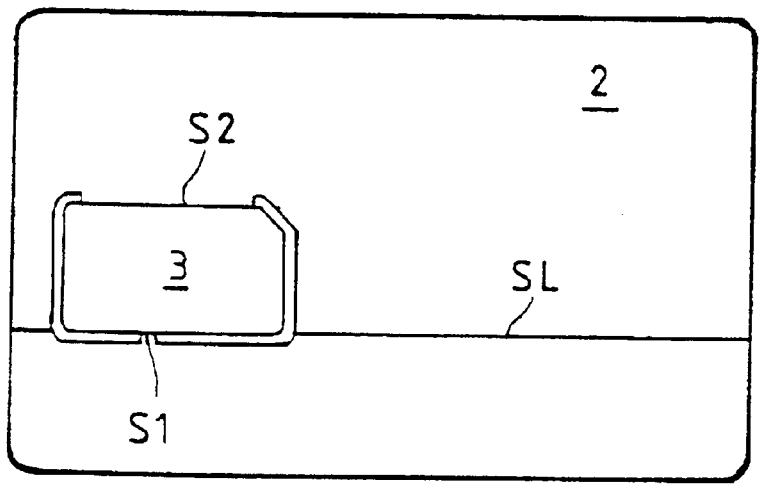
FIG. 15 shows a plan view of the rear side of the plastic card from FIG. 14.

Shown in FIG. 14 is a plastic card (1) in the ID1 format in which the predetermined breaking regions (S1, S2) are arranged along those side edges (32, 33) of the minichip card (3) which run parallel to the longitudinal direction of the ID1 card, the predetermined breaking line/predetermined bending line (SL)—represented by dashed lines—likewise running parallel to the longitudinal direction. FIG. 15 shows the rear side of this card with the notched predetermined breaking line/predetermined bending line.

Figure 16:
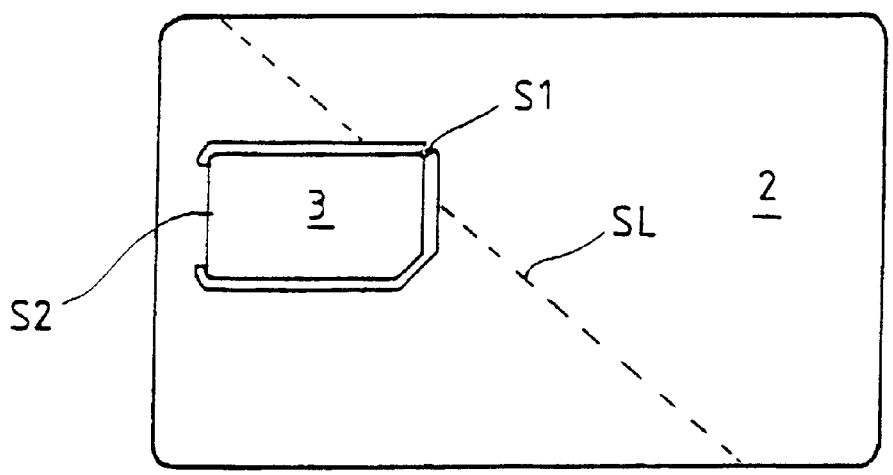
FIG. 16 shows a plan view of a plastic card in which the first predetermined breaking region is arranged at a corner of the minichip card.

Shown in FIG. 16 is a plastic card (1) in the ID1 format in which the first predetermined breaking region (S1) between the minichip card (3) and the carrier card (2) is arranged at a corner region of the minichip card (3). The predetermined breaking line/predetermined bending line (SL) on the carrier card (2) in this case runs parallel to the tangent in the curved corner region (diagonally).

Figure 18:
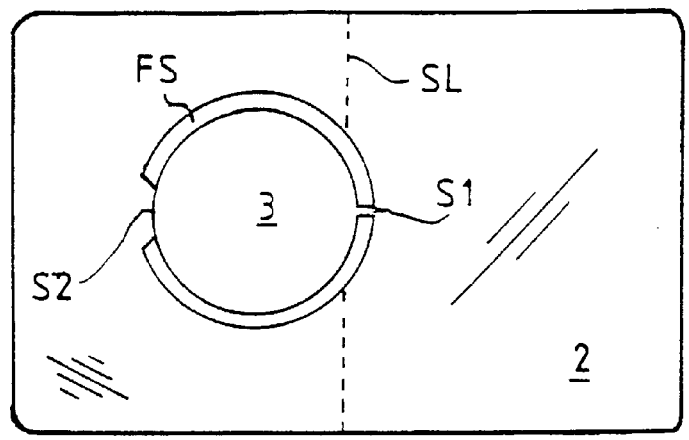
FIG. 18 shows a plan view of the front side of a plastic card with a circular minichip card.
Figure 19:
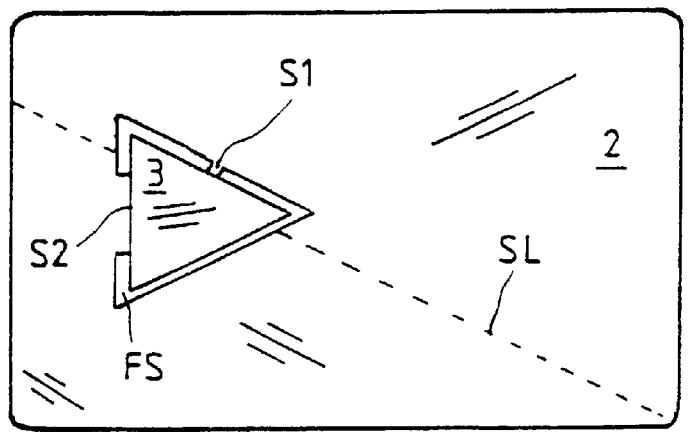
FIG. 19 shows a plan view of the front side of a plastic card with a triangular minichip card.

Shown in FIG. 18 is a plastic card (1) with a circular minichip card (3). Shown in FIG. 19 is a plastic card (1) with a triangular minichip card.

Figure 20:
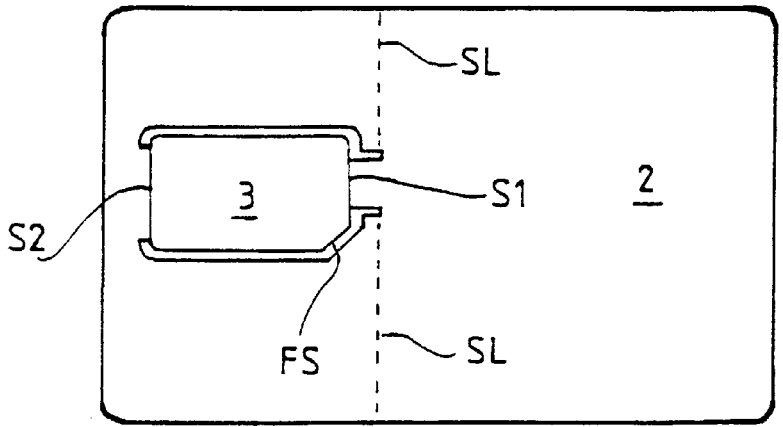
FIG. 20 shows a plan view of the front side of a plastic card, the predetermined breaking line/predetermined bending line running outside the region between the two predetermined breaking regions.

Shown in FIG. 20 is a plastic card (1) where the predetermined breaking line/predetermined bending line (SL) runs outside the region between the two predetermined breaking regions (S1, S2). When the carrier card is severed/bent along the predetermined breaking line/predetermined determined bending line (SL), on account of the special design of the cut-free portion (FS) there is produced a tear-off tab for the connection between the minichip card (3) and the carrier card (2) along the predetermined breaking region (S1).

We claim:

1. A plastic card having a carrier card for separably holding a minichip card, comprising:

a first breaking region along a first portion of an outer contour of the minichip card and a second breaking region along a second portion of the outer contour of the minichip card connecting the minichip card to the carrier card wherein a remainder of the outer contour is separated from the carrier card by a gap;

said first breaking region between the minichip card and the carrier card comprising one of a notch and a connecting lug;

said second breaking region between the minichip card and the carrier card comprising one of a notch and a connecting lug and located a first distance from said first breaking region;

a breaking line on said carrier card comprising one of a notch and a plurality of breaking points lying in a straight line and formed by cut-free portions;

said breaking line operatively positioned closer to said first breaking-region than to said second breaking region and being interrupted by said gap between said minichip card and said carrier card such that when the carrier card is bent along the breaking line, the minichip card separates from the carrier card along the first breaking region and remains separably held to the carrier card along said second breaking region.

2. The plastic card of claim 1, wherein said breaking line runs between the first breaking region and the second breaking region.

3. The plastic card of claim 1, wherein said first breaking region is aligned with said breaking line.

4. The plastic card of claim 1, wherein said breaking line run along said carrier card outside of a region between said first breaking region and said second breaking region.

5. The plastic card of claim 1, wherein said the plastic card comprises a first thickness that is less than the distance of said gap between said minichip card and said carrier card.

6. The plastic card of claim 1, wherein said first breaking region comprises a notch located on both a front side and a rear side of said carrier card.

7. The plastic card of claim 1, wherein said first breaking region comprises a notch located on a front side of said plastic card.

8. The plastic card of claim 1, wherein said first breaking region comprises a notch located on a rear side of said carrier card.

9. The plastic card of claim 5, wherein said first breaking region comprises a connecting lug having a second thickness that is less than the first thickness of the plastic card.

10. The plastic card of claim 1, wherein said first breaking region comprises a connecting lug having a notch.

11. The plastic card of claim 1, wherein said second breaking region comprises a notch located on both a front side and a rear side of said carrier card.

12. The plastic card of claim 1, wherein said second breaking region comprises a notch located on a front side of said plastic card.

13. The plastic card of claim 1, wherein said second breaking region comprises a notch located on a rear side of said carrier card.

14. The plastic card of claim 5, wherein said second breaking region comprises a connecting lug having a third thickness that is less than the first thickness of the plastic card.

15. The plastic card of claim 1, wherein said first breaking region comprises a connecting lug having a notch.

16. The plastic card of claim 1, wherein said first breaking region comprises a first breaking strength and said second breaking region comprises a second breaking strength when a central or uniform force is applied to the minichip card and said first breaking strength equals said second breaking strength.

17. The plastic card of claim 1, wherein said first breaking region comprises a first breaking strength and said second breaking region comprises a second breaking strength when a central or uniform force is applied to the minichip card and said first breaking strength in not equal to said second breaking strength.

18. The plastic card of claim 1, wherein said breaking line comprises a notch on a rear side of said carrier card.

19. The plastic card of claim 1, wherein said breaking line comprises a notch on a front side of said carrier card.

20. The plastic card of claim 1, wherein said breaking line comprises a notch on both a front side and a rear side of said carrier card.

21. The plastic card of claim 1, wherein said breaking line comprises a notch which runs along a plurality of breaking points lying in a straight line.

22. The plastic card of claim 1, wherein a shape of the minichip card comprises at least one side.

23. The plastic card of claim 1, wherein said first breaking region runs along a first side of said at least one side of the minichip card;

said second breaking region runs along a second side of said at least one side of the minichip card; and said breaking line runs parallel to one of said first side and said second side.

24. The plastic card of claim 22, wherein said first breaking region is located at a corner portion at an intersection of a first and second sides of said at least one side of said minichip card and said second breaking region is located along a third side of said at least one side of said minichip card.

25. The plastic card of claim 24, wherein said breaking line runs parallel to said third side.

26. The plastic card of claim 24, wherein said breaking line runs along a line parallel to a tangent of the corner portion at the intersection of the first and second sides.

27. The plastic card of claim 1, wherein said plastic card comprises an ID1 format in accordance with a card standard ISO 7810 and the minichip card comprises an ID000 format such that said minichip card is positioned in accordance with a chip card standard ISO 7816-2.

28. The plastic card of claim 27, wherein said first and second breaking regions run along a first side and a second side of the minichip card which in turn, run parallel to a pair of short sides of the carrier card, respectively, and said breaking line likewise running parallel to a transverse direction of the carrier card.

29. The plastic card of claim 27, wherein said first and second breaking regions run along a first side and a second side of the minichip card which in turn, run parallel to a pair of long sides of the carrier card, respectively, and said breaking line likewise running parallel to a longitudinal direction of the carrier card.

30. The plastic card of claim 1, wherein at least one of said first breaking region, said second breaking region, and said breaking line comprises a notch having a wedge-shaped profile.

31. The plastic card of claim 1, wherein at least one of said first breaking region, said second breaking region, and said breaking line comprises a notch having a V-shaped profile.

32. The plastic card of claim 1, wherein at least one of said first breaking region, said second breaking region, and said breaking line comprises a notch having a U-shaped profile.

33. The plastic card of claim 1, wherein at least one of said first breaking region, said second breaking region, and said breaking line comprises a notch having a trapezoidal-shaped profile.

34. The plastic card of claim 1, wherein said plastic card comprises a plurality of laminated layers and said first breaking region, said second breaking region, said breaking line, and said gap between said minichip card and said carrier card are formed on said plastic card by a process using at least one of a punching and notching tool.

35. The plastic card of claim 1, wherein said plastic card is injection molded and said first breaking region, said second breaking region, said breaking line, and said gap between said minichip card and said carrier card are formed on said plastic card by a process using at least one of a punching and notching tool.

36. The plastic card of claim 1, wherein said plastic card, comprising said first breaking region, said second breaking region, said breaking line, and said gap between said minichip card and said carrier card, is injection molded in one piece.

* * * * *